United States Patent [19]
Carnevale et al.

[11] Patent No.: US 6,173,622 B1
[45] Date of Patent: Jan. 16, 2001

(54) AUTOMATIC TRANSMISSION SHIFTER CONTROL TOWER

(75) Inventors: Gregory S. Carnevale, Chatham; Stephen J. Wilford, Comber; Joe Terpstra, Chatham, all of (CA)

(73) Assignee: Navistar International Transportation, Chicago, IL (US)

(*) Notice: Under 35 U.S.C. 154(b), the term of this patent shall be extended for 0 days.

(21) Appl. No.: 09/293,532

(22) Filed: Apr. 15, 1999

(51) Int. Cl.⁷ ..................................... F16H 59/02
(52) U.S. Cl. .................. 74/335; 29/401.1; 74/473.12; 74/473.18; 74/473.3; 74/483 PB; 180/336; 439/34
(58) Field of Search ...................... 74/335, 473.12, 74/473.18, 473.3, 483 PB; 180/336; 439/34; 29/401.1

(56) References Cited

U.S. PATENT DOCUMENTS

| | | | |
|---|---|---|---|
| 3,800,924 | * 4/1974 | Hansen | 74/473.33 X |
| 4,297,914 | * 11/1981 | Klem et al. | 74/532 |
| 4,546,664 | * 10/1985 | Mylander | 74/473.19 |
| 4,790,204 | * 12/1988 | Tury et al. | 74/483 PB |
| 4,930,366 | * 6/1990 | Boucher et al. | 200/61.54 X |
| 5,042,314 | * 8/1991 | Rytter et al. | 74/335 |
| 5,768,942 | * 6/1998 | Gruber et al. | 74/89.14 |
| 5,833,578 | * 11/1998 | Potis | 74/473.19 X |

* cited by examiner

Primary Examiner—Allan D. Herrmann
(74) Attorney, Agent, or Firm—Jeffrey P. Calfa; Dennis K. Sullivan

(57) ABSTRACT

A shift tower housing for a vehicle transmission that can receive either a push button selector or a lever selector at a comfortable and ergonomic location. The surfaces of both the push button and the lever selectors are at about 15% to the horizontal, which renders surface indicia on the selectors in a comfortable vision range for the operator. The inclined upper surfaces of the selectors also places lever and push buttons at comfortable ergonomic position for the operator. Replacing a single mounting part can make a conversion from a push button selector unit to a push button selector unit. The shift tower also includes mounting mechanism upon which a stand-alone electronic control unit is mounted, that is compatible with either the push button selector or the lever selector control. The vibrations of the shift tower are minimized as a result of mounting it directly to vehicle floor support member.

17 Claims, 4 Drawing Sheets

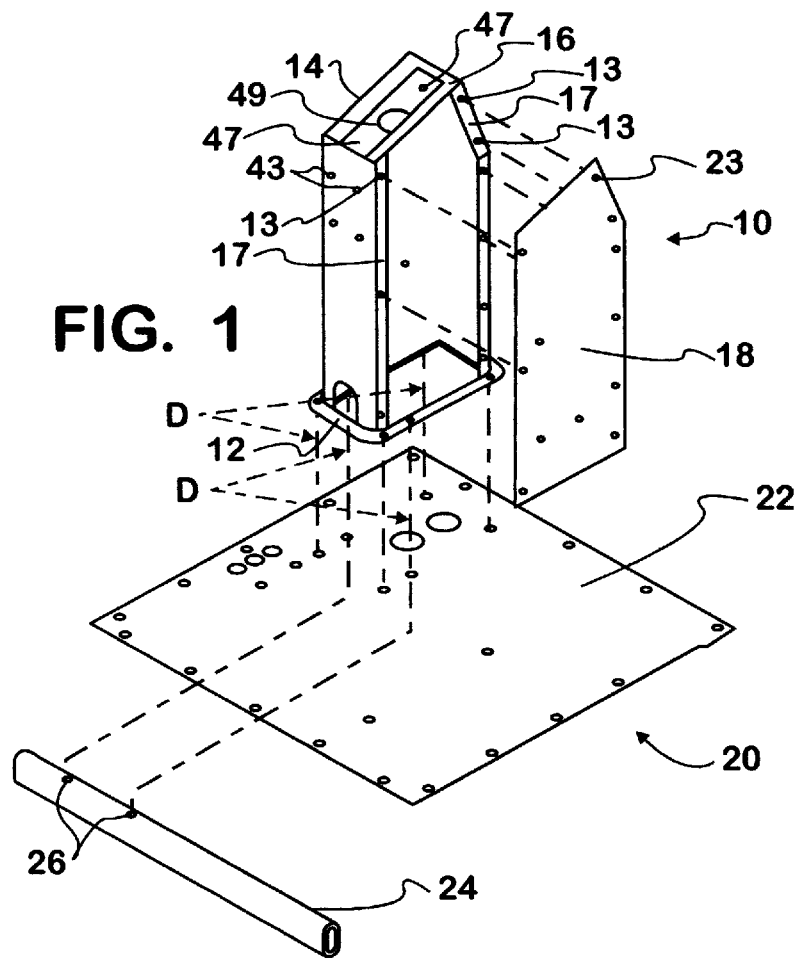
FIG. 1
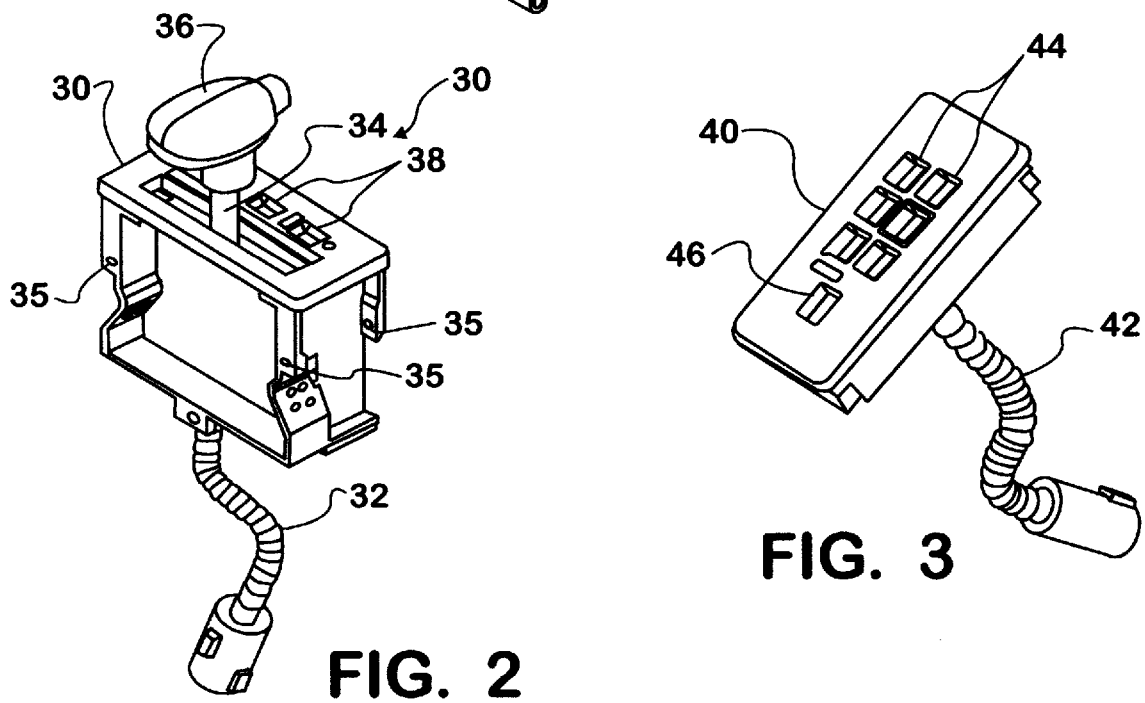
FIG. 2
FIG. 3

AUTOMATIC TRANSMISSION SHIFTER CONTROL TOWER

BACKGROUND OF THE INVENTION

This invention relates generally to a control tower for a gear select transmission shifter and, more particularly, to a control tower that can be used for either a lever selector or a push button selector. The control tower of this invention has been developed for use with a transmission (part number HD-4560P) and gear selectors (part numbers AS07-113 & AS07-114) manufactured by Allison Transmissions, of XXXX. However, it could be used for other transmissions and gear selectors of comparable size and design. Either the lever selector (part number AS07-114) or the push button selector (part number AS07-114) can shift the same transmission, for example, part number HD-4560P manufactured by Allison Transmissions. In the past, Allison Transmissions offered a lever type gear selector with an integral electronic control unit and a push button type gear selector with an integral electronic control unit. Control towers to accommodate those combined units required additional mounting parts to receive one or the other selectors. Also, when the control tower was used for the push button selector, it was mounted such that it extended from the cab floor at an angle, which resulted in locating the selector at an uncomfortable position for the operator of the vehicle. The special mounting parts increased the complexity and cost of assembly as well as the number of repair parts that must be inventoried. Also, a defective selector unit required replacing the entire selector-electronic control unit combination, which increased considerably the cost of repairing a gear selector, as well as requiring very expensive units to be carried in the replacement parts inventory.

BRIEF SUMMARY OF THE INVENTION

The control tower of this invention can be used for either the lever selector or the push button selector, and only a single additional part is needed for either the lever selector or the push button selector. The shift tower has a generally rectangular cross section, the longitudinal axis of which extends parallel to the vehicle longitudinal axis. The front side of the shift tower faces the forward direction of the vehicle and the rear side of the shift tower faces the reverse direction of the vehicle. The vehicle operator is seated to the rear of the vehicle relative to the location of the shift tower such that the operator sees the rear side of the shift tower. The vehicle operator is also located to the left side of the shift tower. The eye level of the vehicle operator is above the top of the shift tower. The top edge of the shift tower is formed by the top edge of a three-sided vertically extending housing and a top brace member that, together, define a gear selector receiving opening. Both the lever selector and the push button selector are sized to be received in the gear selector-receiving opening. The top edge of the shift tower lies in a plane that is elevated from the back side to the front side of the shift tower at an angle of about fifteen degree to the horizontal. This orientates the top surfaces of the lever selector and the push button selector at an inclined angle to the operator's line of vision which facilitates the operator's view of the indicia and read-outs contained on the top surfaces of the selectors. As a result to this orientation, the shift tower is located relative to the vehicle operator such that it is comfortable and ergonomic for the operator to reach the lever or push button selectors and to view the indicators on the top surfaces.

This invention allows the push button selector to be orientated at an angle of fifteen degrees to the horizontal without the need for additional mounting parts and provides an ergonomically comfortable and desirable design for the operator of the vehicle. In addition, as a result of anchoring the control tower of this invention to a structural floor support, the control tower vibrations have been significantly reduced from that present in the prior design. Furthermore, the control tower of this invention is lighter and costs less to manufacture. For these reasons, the control tower of this invention is a significant improvement over past control towers.

BRIEF DESCRIPTION OF SEVERAL VIEWS OF THE DRAWINGS

FIG. 1 is an exploded view of the control shift tower and its vehicle mounting support. (T13-51461)

FIG. 2 is an isolated perspective view of the lever selector.

FIG. 3 is an isolated perspective view of the push button selector.

FIG. 11 is a perspective view of the transmission including the wiring harness that shift controls and the electronic control units are connected to.

DETAILED DESCRIPTION OF THE INVENTION

Figure 4:
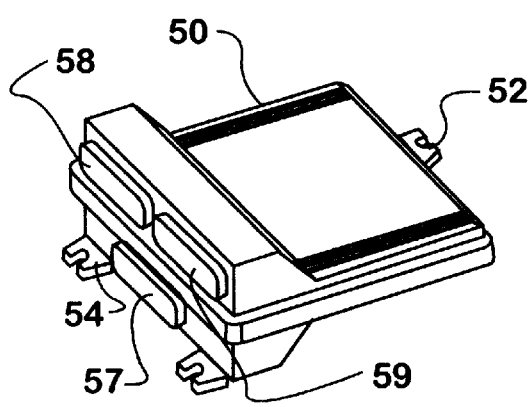
FIG. 4 is an isolated perspective views of the stand-alone electronic control unit.

There is shown in FIG. 1 an exploded view of the control shift tower 10 and its vehicle mounting support 20. The control shift tower 10 and mounting support 20 is used for either the push button control or the lever control.

The control shift tower 10 includes a mounting base plate 12, a three-sided vertically extending housing 14, a top brace member 16 and a cover plate 18. The three-sided vertically extending housing 14 has a front side that faces the forward direction of the vehicle and a rear side that faces the reverse direction of the vehicle. The vertical edges of the three-sided vertically extending housing 14 have flanges 17 extending therefrom. Flanges 17 lay in a plane that extends from the front to the back sides of the control shift tower 10. The top brace member 16 permanently connects the open sides of the three-sided vertically extending housing 14 by welding or the like. The rear side of the three-sided vertically extending housing 14 has an archshaped opening 15 formed therein through which a section of the wiring harness 60 exits the control shift tower 10. The cover plate 18 can be readily removed for servicing the mechanisms housed in the control shift tower 10.

Figure 10:
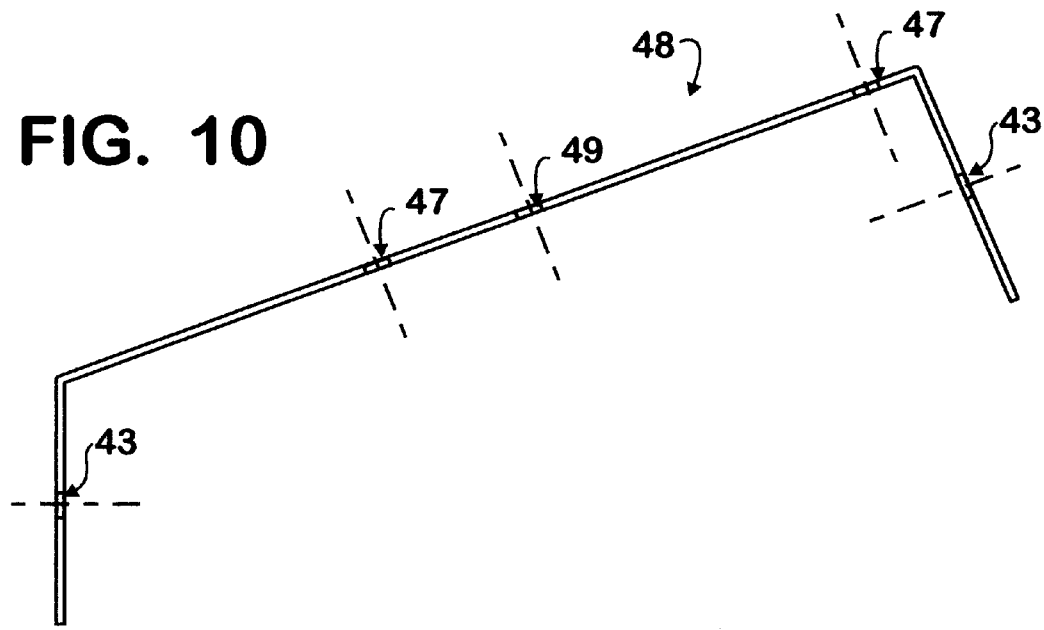
FIG. 10 is a side view of a bracket used to mount the push button selector in the control shift tower.

The bracket 48, seen in FIG. 1, is used only with the push button selector 40 and will be fully discussed with reference to FIGS. 10 and 1.

The vehicle mounting support 20 includes a cab floor plate 22 and a floor support 24. The cab floor plate 22 is made of heavy gauge sheet metal and is carried by the vehicle frame. The floor support 24 is a rigid channel that is part of the vehicle frame or directly connected to the vehicle frame. As indicated by the dashed lines D, fasteners extend through apertures formed in the mounting base 12 and the cab floor plate 22 to secure the control shift tower 10 to the cab floor plate 22. Two of the fasteners also extend into apertures 26 formed in the floor support 24 to thereby securely connect the control shift tower 10 to the vehicle frame. This mounting arrangement provides for a much improved mounting for the control shift tower and results in a lower vibration rate for the control shift tower 10.

FIG. 2 shows the lever selector 30 along with its umbilical cord 32 that is connected to the transmission 80 and the electronic control unit 50, as shall be discussed in greater detail. The lever selector 30 includes a lever 34 having a knob 36 and gear indicator displays 38. As shall be further discussed, the lever selector 30 will be mounted on the control shift tower 10 at an angle of 15% to the horizontal, which enhances the operator's view of the gear indicator displays 38 as well as improves the ergonomically qualities of the unit. As previously indicated, this unit is a purchased unit and details of the mechanism that are housed in this unit and to which the lever 34 is connected are not shown in this view.

FIG. 3 shows the push button selector 40 along with its umbilical cord 42 that is connected to the transmission 80 and the stand-alone electronic control unit 50 as shall be discussed in greater detail. The push button selector 40 includes a plurality of push buttons 44 and gear indicator displays 46. As shall be further discussed, the push button selector 40 will be mounted on the control shift tower 10 at an angle of 15% to the horizontal which enhances the operator's view of the gear indicator displays 46 while the buttons 44 are ergonomically located for the operator's convenience.

FIG. 4 is a perspective view of the electric control unit 50 that is used in combination with either the lever selector 30 or push button selector 40. The stand-alone electronic control unit 50 includes mounting slots 52, 54 and 56 for securing the unit within the control shift tower 10. The stand-alone electronic control unit 50 also includes plugs 57, 58 and 59 to which portions of the wiring harness 60 are connected.

Figure 5:
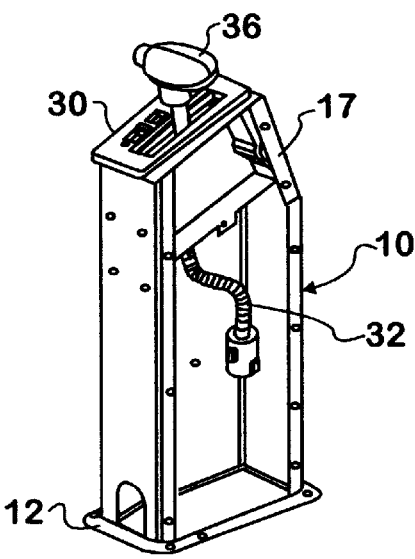
FIG. 5 is a perspective view of the shift control tower with the lever selector mounted thereon and with the cover plate removed.

FIG. 5 is a perspective view of the control shift tower 10 with the lever selector 30 mounted thereon. In this view, the cover plate 18 is not shown to better show the inside of the control shift tower 10. Also in this view, the electronic control unit 50 is not shown.

Figure 6:
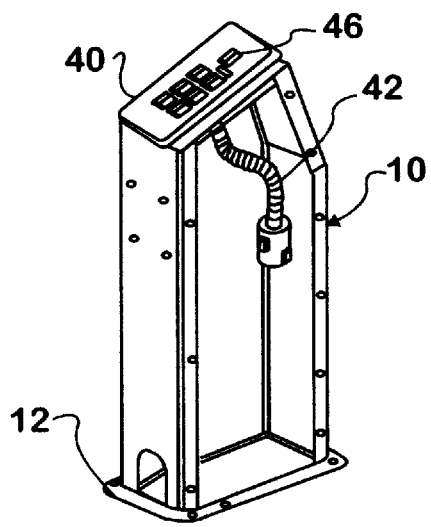
FIG. 6 is a perspective view of the shift control tower with the push button selector mounted thereon and with the cover plate removed.

FIG. 6 is a perspective view of the control shift tower 10 with the push button selector 40 mounted thereon. In this view, the cover plate 18 is not shown to better show the inside of the control shift tower 10. Also in this view, the electronic control unit 50 is not shown.

Figure 7:
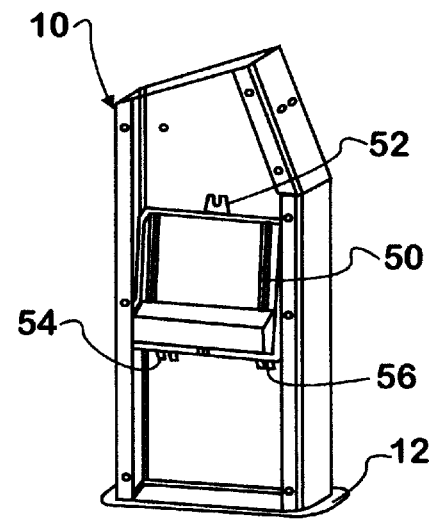
FIG. 7 is a perspective view of the shift control tower with the stand-alone electronic control unit mounted thereon and with the cover plate removed.

FIG. 7 is a perspective view of the control shift tower 10 with the stand-alone electronic control unit 50 mounted thereon. The stand-alone electronic control unit 50 will be mounted as shown in this view for the embodiment including the lever selector 30 and the embodiment including the push button selector 40. It should be noted that the stand-alone electronic control unit is hung in the control shift tower 10 such that the plugs 57, 58 and 59 are at the bottom. This arrangement renders the electrical system less likely to be damaged if water or other moisture were to accidentally enter the interior of the control shift tower 10. In this view, the cover plate 18 is not shown to better show the inside of the control shift tower 10. Also in this view, the lever selector 30, the push button selector 40 nor the bracket 48 are shown.

Figure 8:
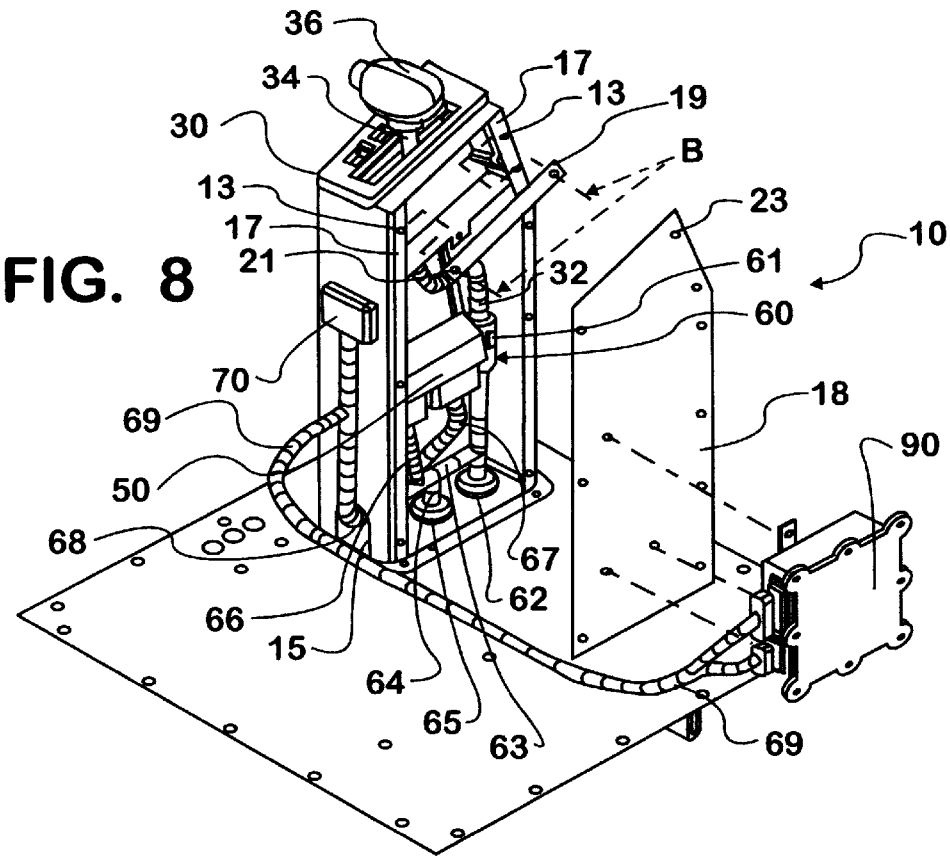
FIG. 8 is a partially exploded perspective view of the shift control tower with the lever control and the stand-alone electronic control unit mounted thereon and also includes the wiring harness for the unit.

FIG. 8 is a partially exploded perspective view of the shift control tower 10 with the lever selector 30 and the stand-alone electronic control unit 50 mounted thereon. This view also shows the wiring harness 60 that interconnects the lever selector 30 and stand-alone electronic control unit 50 with the vehicle engine and transmission 80.

Also shown in FIG. 8 is a brace 19 that has an aperture 21 formed in each end thereof. Brace 19 is used only in the embodiment that includes the lever selector 30. Elongated bolts are inserted through apertures (not shown) formed in the side of the three-sided vertically extending housing 14 that is opposite cover plate 18. The elongated bolts extend through two sets of aligned apertures 35 formed in the lever selector 30, see FIG. 2. The free ends of elongated bolts extend through apertures 21 formed in brace 19; apertures 13 formed in flanges 17 and apertures 23 formed in cover plate 18. The path of the elongated bolts is traced by the dash line identified as B in FIG. 8. Fasteners, such as nuts or wing nuts, are tightened down on the free ends of the elongated bolts to thus secure the lever selector 30 to the control shift tower 10.

In FIG. 8, the umbilical cord 32 of the lever selector 30 is connected to an end 61 of the wiring harness 60. Wiring harness 60 extends down to a first bulkhead connector 62. The wiring harness 60 branches off above the first bulkhead connector 62 into a horizontal section 63 that includes a downwardly extending portion 64 that extends to a second bulkhead connector 65. An engine wire harness (not shown) plugs into the other bulkhead connector 65. The wiring harness 60 also includes sections 66 and 67 that extends up and are connected to the electronic control mechanism 50 through two of the plugs 57–59. Another section 68 of wiring harness 60 extends through the arch shaped opening 15 and then to a diagnostic connector box 70 into which diagnostic equipment can be linked. The rear side of the three-sided vertically extending housing 14 carries diagnostic connector box 70. A branch 69 of the section 68 extends to the vehicle interface module 90 that is secured to the outer surface of the cover plate 18.

Figure 9:
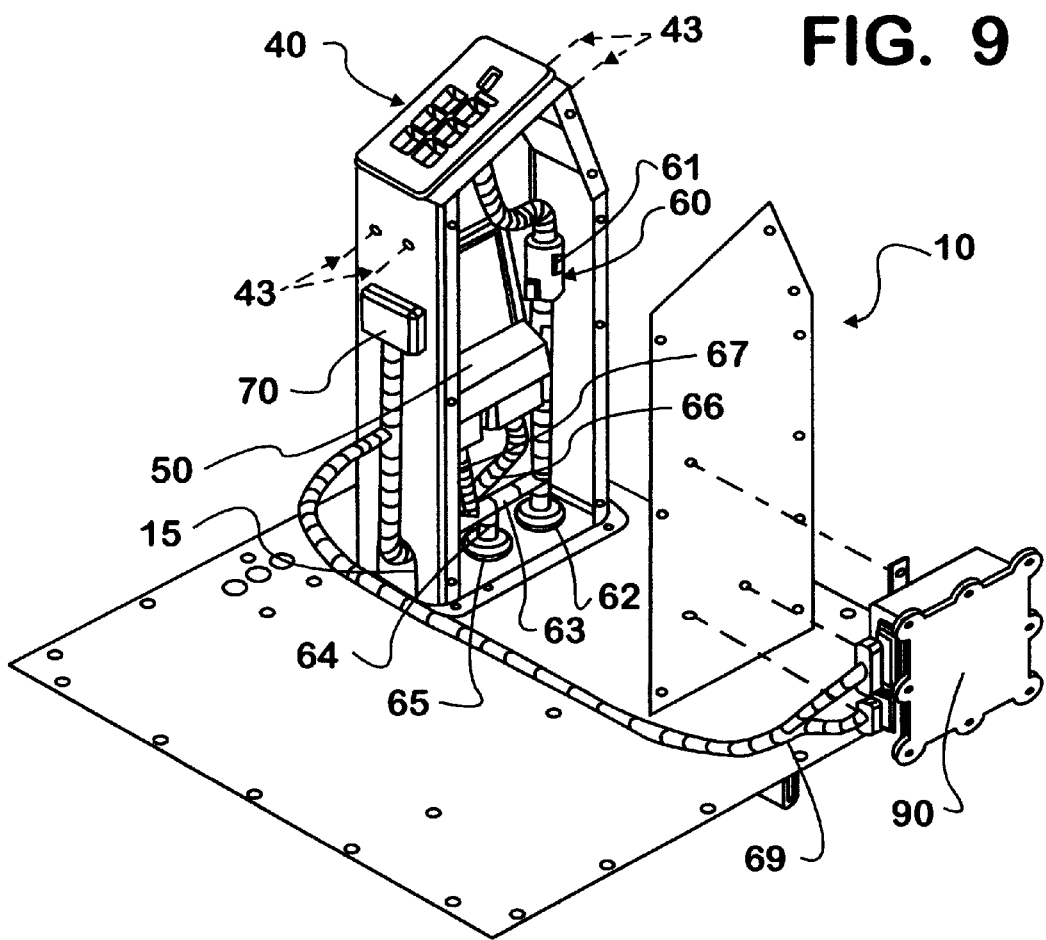
FIG. 9 is a partially exploded perspective view of the shift control tower with the push button control and the stand-alone electronic control unit mounted thereon and also includes the wiring harness for the unit.

FIG. 9 is a partially exploded perspective view of the shift control tower 10 with the push button selector 40 and the stand-alone electronic control unit 50 mounted thereon. This view also shows the wiring harness 60 that interconnects the push button selector 40 and stand-alone electronic control unit 50 with the vehicle engine and transmission 80.

In FIG. 9, the umbilical cord 42 of the push button selector 40 is connected to an end 61 of the wiring harness 60. Wiring harness 60 extends down to a first bulkhead connector 62. The wiring harness 60 branches off above the first bulkhead connector into a horizontal section 63 that includes a downwardly extending portion 64 that extends to a second bulkhead connector 65. The wiring harness 60 also includes sections 66 and 67 that extend up and are connected to the electronic control mechanism 50 through two of the plugs 57–59. Another section 68 of wiring harness 60 extends through the arch shaped opening 15 and then to a diagnostic connector box 70 into which diagnostic equipment can be linked. The three-sided vertically extending housing 14 carries diagnostic connector box 70. A branch 69 of the section 68 extends to the vehicle interface module 90 that is secured to the outer surface of the cover plate 18.

As seen in FIG. 1, bracket 48 has a large aperture 49 and two small apertures 47 formed therein. The bracket 48 is secured to the top of control shift tower 10 by fasteners that extend through apertures 43 that are formed in the edges of bracket 48 and in the front and rear sides of the three-sided vertically extending housing. The umbilical cord 42 for the push button selector 40 extends through the large aperture 49 and fasteners for the push button selector 40 are received in the small apertures 47 that are used to and are secured in the top of control shift tower 10. Bracket 48 is used only with the push button selector 40. A cross-section view of bracket 48 is shown in FIG. 10.

Figure 11:
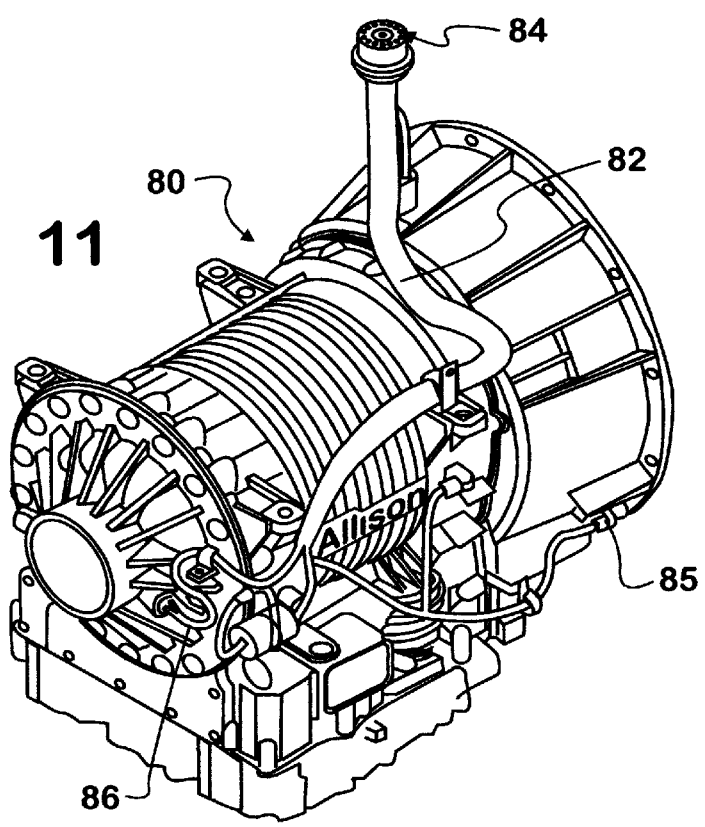

FIG. 11 is a perspective view of a transmission 80 that is of the type that can be controlled by selectors 30 and 40. The transmission wiring harness 82 is shown in this view. At the free end of wiring harness 82 is a female connector 84 that plugs into bulkhead connector 62. An engine wire harness (not shown) plugs into the other bulkhead connector 65.

The foregoing specification describes only preferred embodiments of the invention as shown. Embodiments other than the ones described above may be articulated as well. The terms and expressions therefore serve only to describe the invention by example only and not to limit the invention. It is expected that others perceive differences which, while differing from the foregoing, do not depart from the spirit and scope of the invention herein described and claimed.

We claim:

1. A shift control tower for a transmission that is controlled electronically comprising and a vehicle mounting support comprising:
   said vehicle mounting support including a cab floor plate that overlies a structural floor support member;
   said shift control tower including a front side that faces the forward direction of the vehicle and a rear side that faces the reverse direction of the vehicle,
   said shift control tower further including a mounting base plate and a three-sided vertically extending housing that is permanently secured to said mounting base plate, said three-sided vertically extending housing having a top edge and a top brace member, said top brace member extending from said front side to said rear side of said shift control tower and is secured thereto to close said three-sided vertically extending housing and complete and become part of said top edge to thus define a gear selector receiving opening at the top of said shift control tower;
   said top edge laying in a plane that is inclined from said rear side to said front side of said shift control tower; and
   a gear selector member sized to be received in said gear selector opening and secured to said shift control tower such that it is inclined from the rear side to the front side of said shift control tower.

2. A shift control tower as set forth in claim 1 wherein:
   said three-sided vertically extending housing includes vertically extending flanges along its vertical edges, said vertically extending flanges laying in a plane that extends from the front side to the rear side of said shift control tower.

3. A shift control tower as set forth in claim 1 wherein:
   said shift control tower is secured to said vehicle mounting support by fasteners that extend through said mounting base plate and said cab floor plate, and wherein some of said fasteners are also secured to said structural floor support member.

4. A shift control tower as set forth in claim 1 wherein:
   a stand-alone electronic control unit is mounted in said shift control tower;
   a wire harness within said shift control tower electronically connecting said gear selector member to said stand-alone electronic control unit.

5. A shift control tower as set forth in claim 2 wherein:
   said three-sided vertically extending housing is adapted to be closed by a vertically extending cover plate that can be releasably secured to said flanges.

6. A shift control tower as set forth in claim 2 wherein:
   said gear selector member is a lever type gear selector, said lever type gear selector including transversely extending mounting openings, a brace having apertures that are aligned with said transversely extending mounting openings, apertures formed in said three-sided vertically extending housing and in said flanges that are aligned with said transversely extending mounting openings, fasteners extending through the aligned openings and apertures for securing said lever type gear selector to said shift control tower.

7. A shifting apparatus for a vehicle transmission, comprising:
   a vertically extending shift tower;
   a lever selector carried by said shift tower, said lever selector having a top face that is inclined from the back to the front of the vehicle, said lever selector including a shift lever including a knob at its free end, said knob extending outwardly from said shift tower and being manually actuatable, such that a vehicle operator seated to the rear of said shift tower has a clear view of said inclined top face and an ergonomic grasp of said knob;
   a transmission electronic control unit housed in said shift tower;
   a wiring harness within said shift tower interconnecting said lever selector and said transmission electronic control unit; and
   said wiring harness including connectors for the transmission and the vehicle engine.

8. A shifting apparatus for a vehicle transmission as set forth in claim 7 wherein:
   said shift tower includes a mounting base plate that enables the shift tower to be securely mounted to the vehicle frame.

9. A shifting apparatus for a vehicle transmission as set forth in claim 7 wherein:
   said shift tower includes an easily removable cover plate to enable easy access to the interior of said shift tower.

10. A shifting apparatus for a vehicle transmission as set forth in claim 8 wherein:
    said shift tower includes an easily removable cover plate to enable easy access to the interior of said shift tower.

11. A shifting apparatus for a vehicle transmission, comprising:
    a vertically extending shift tower;
    a push button selector carried by said shift tower, said push button selector having a top face that is inclined from the back to the front of the vehicle, said push button selector including a set of push buttons in said top face, said set of push buttons being manually actuatable, such that a vehicle operator seated to the rear of said shift tower has a clear view of said inclined top face and an ergonomic reach of said push buttons;

a transmission electronic control unit housed in said shift tower;

a wiring harness within said shift tower interconnecting said push button selector and said transmission electronic control unit; and said wiring harness including connectors for the transmission and the vehicle engine.

12. A shifting apparatus for a vehicle transmission as set forth in claim 11 wherein:

said shift tower includes a mounting base plate that enables the shift tower to be securely mounted to the vehicle frame.

13. A shifting apparatus for a vehicle transmission as set forth in claim 11 wherein:

said shift tower includes an easily removable cover plate to enable easy access to the interior of said shift tower.

14. A shifting apparatus for a vehicle transmission as set forth in claim 12 wherein:

said shift tower includes an easily removable cover plate to enable easy access to the interior of said shift tower.

15. A shifting apparatus for a vehicle transmission including a shift tower, comprising:

a vertical tower having an upper edge;

said upper edge laying in a plane that is elevated from the rear side to the front side at an angle of about 15% to the horizontal;

said upper edge defining a gear selector opening in the top of said shift tower;

a gear selector, having an upper surface, received in said gear selector opening such that said upper surface is parallel to the plane of said upper edge;

fasteners securing said gear selector to said vertical tower;

a electronic control unit mounted within said vertical tower;

a wiring harness in said vertical tower interconnecting said gear selector and said electronic control unit, said wiring harness including connectors for connecting the wiring harness to the vehicle transmission and engine.

16. A shifting apparatus for a vehicle transmission as set forth in claim 15 wherein:

said gear selector is of the lever type.

17. A shifting apparatus for a vehicle transmission as set forth in claim 15 wherein:

said gear selector is of the push button type.

* * * * *